(12) United States Patent
Blinnikka et al.

(10) Patent No.: US 8,713,439 B2
(45) Date of Patent: Apr. 29, 2014

(54) SYSTEMS AND METHODS FOR PROVIDING A VIDEO PLAYLIST

(75) Inventors: Tomi Blinnikka, Berkeley, CA (US); Steven Horowitz, Oakland, CA (US)

(73) Assignee: Yahoo! Inc., Sunnyvale, CA (US)

( * ) Notice: Subject to any disclaimer, the term of this patent is extended or adjusted under 35 U.S.C. 154(b) by 853 days.

(21) Appl. No.: 11/611,783

(22) Filed: Dec. 15, 2006

(65) Prior Publication Data
US 2008/0148152 A1  Jun. 19, 2008

(51) Int. Cl.
*G11B 27/34* (2006.01)

(52) U.S. Cl.
USPC ............... 715/723; 715/203; 715/972

(58) Field of Classification Search
USPC .......... 715/719, 203, 716, 723, 724, 731, 972
See application file for complete search history.

(56) References Cited

U.S. PATENT DOCUMENTS

| | | | |
|---|---|---|---|
| 6,400,378 B1 * | 6/2002 | Snook | 715/716 |
| 2002/0042834 A1 * | 4/2002 | Kremens et al. | 709/231 |
| 2004/0021666 A1 * | 2/2004 | Soll et al. | 345/474 |
| 2006/0251294 A1 * | 11/2006 | Soll et al. | 382/107 |

* cited by examiner

*Primary Examiner* — Namitha Pillai
(74) *Attorney, Agent, or Firm* — James J. DeCarlo; Greenberg Traurig, LLP

(57) ABSTRACT

Systems and Methods of presenting video on a display are disclosed. A video clip is displayed on a video display area. The video clip is one of a plurality of video clips in a video playlist. A playlist pane can be displayed and includes video thumbnails displayed in an order that is representative of an order of playing the video clips in the video playlist. Furthermore, one or more selectable video thumbnails can also be displayed. A drag and drop input is received from a user in order to place on the playlist pane a selected video thumbnail from the one or more selectable video thumbnails. The video content corresponding to the selected video thumbnail is added in real-time to the video playlist while simultaneously continuing to play the video clip on the video display area.

17 Claims, 9 Drawing Sheets

SYSTEMS AND METHODS FOR PROVIDING A VIDEO PLAYLIST

BACKGROUND

1. Field

This disclosure relates to methods and systems for playing video on a computer display.

2. General Background

The expansion of the Internet and the World Wide Web ("web") has given computer users the enhanced ability to listen to and to watch various different forms of media through their computers. Such media can be in the form of audio music, music videos, and television programs, sporting events or any other form of audio or video media that a user wishes to watch or listen to. Media is now overwhelmingly being distributed through computer networks. Furthermore, users frequently access videos via personal computers, handheld devices, etc. However, every time a user wants to view multiple videos, the user generally has to finish watching one video to select the next video to watch.

SUMMARY

In one aspect, there is a method of presenting video on a display. A video clip is displayed on a video display area. The video clip is one of a plurality of video clips in a video playlist. A playlist pane can be displayed and includes video thumbnails displayed in an order that is representative of an order of playing the video clips in the video playlist. Furthermore, one or more selectable video thumbnails can also be displayed. A drag and drop input is received from a user in order to place on the playlist pane a selected video thumbnail from the one or more selectable video thumbnails. The video content corresponding to the selected video thumbnail is added in real-time to the video playlist while simultaneously continuing to play the video clip on the video display area.

In a further aspect, the video clips of the video playlist are played in the order of play of the associated video playlist upon receiving a user play command.

In another aspect, the video content can be downloaded from a video server, from a storage device, etc.

In another aspect, the drag and drop input includes a command to append the selected video thumbnail at the end of the thumbnail queue. The drag and drop input can also include a command to insert the selected video thumbnail in between two thumbnails of the thumbnail queue. In addition, a user input that includes a command to delete a video thumbnail previously added to the video playlist can also be received.

In one aspect, there is a system for presenting video comprising a computer display, a user interface module and a video queuing module. The computer display displays one or more selectable video thumbnails. The user interface module can be configured to receive a drag and drop input form a user in order to place a selected video thumbnail from the one or more selectable video thumbnails on a playlist pane. The playlist pane can include video thumbnails disposed in a thumbnail queue having an order that is representative of the order of playing the video clips in an associated video playlist. The video queue module can be configured to add video content corresponding to the selected video thumbnail to the video playlist. In another aspect, a video server stores the video content.

In a further aspect, a video rendering module can be part of the system. The video rendering module can be configured to play the video clips of the video playlist in the order of play of the associated video playlist upon receiving a user play command.

In one aspect, there is a user interface for presenting video comprising a first display pane and a second display pane. The first display pane can display one or more video thumbnails in a displayed order representing an order of playing the video clips in a video playlist. The second display pane can contain selectable video thumbnails. At least one video thumbnail of the selectable video thumbnails can be dragged by a user to the fist display pane to alter the displayed order and the playing order.

DRAWINGS

The features and objects of alternate embodiments of the present disclosure will become more apparent with reference to the following description taken in conjunction with the accompanying drawings of various examples wherein like reference numerals denote like elements and in which.

DETAILED DESCRIPTION

A system and method of creating a video playlist is provided herein. The playlist of video clips can be built by providing one or more thumbnails representing video clips, and allowing a user to drag and drop the one or more thumbnails into a separate playlist pane. The playlist pane includes video thumbnails corresponding to the video clips in a video playlist. The video thumbnails in the playlist pane can be ordered in the same order of play as the corresponding video playlist. Therefore, by dragging and dropping, and manipulating the order of the video thumbnails in the playlist pane, the user can edit the video playlist associated with the playlist pane. Other video representations can be used in the playlist pane. For example, text corresponding to the title of each video clip can be utilized instead of the video thumbnail. Any other user interface mechanisms can also be used.

As used herein, a video thumbnail is a representative still image of video content. The representative still image can be for example, a frame of the video content. In addition, as used herein a video playlist is a list of two or more video references having an order of play. The video references can be file paths to video content such as video clips, universal resource locator paths (URL), or any other referencing mechanism to reference video content. The order of play associated with the video playlist can be utilized to automatically play all of the referenced content by the playlist. Furthermore, a user can select video clips from multiple storage devices and websites, and make a playlist of video clips to view.

Figure 1A:
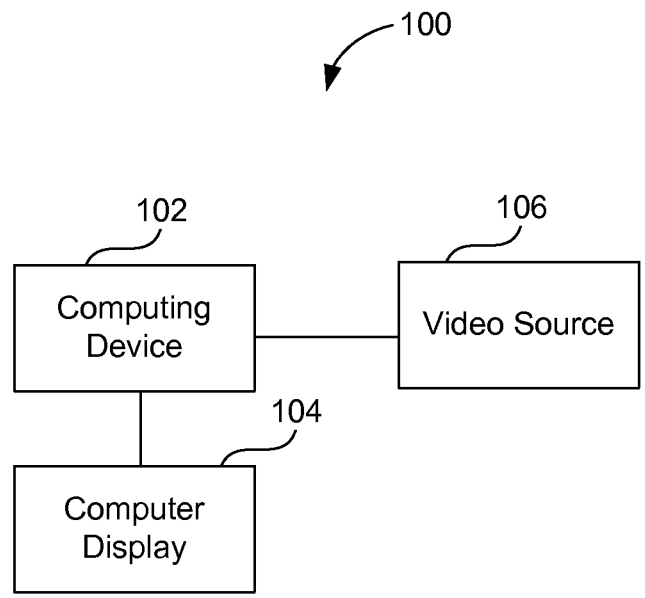
FIGS. 1A-1B depict examples of a system for presenting video according to one embodiment.

FIG. 1A depicts a system for presenting video. System 100 includes a computing device 102 that communicates with a video source 106 in order to receive a video signal from the video source 106. Upon receiving the video signal from the video source 106, the computing device 102 can then decode the video signal to a video output format that can be communicated to the display 104 for viewing. The computing device 102 can also be configured to receive pre-recorded or downloaded video from the video source 106.

In one embodiment, the video source can be a computer server that streams video clips to the computing device 102 over a computer network such as the Internet. In yet another embodiment, the video source 106 can be another computing device that transmits video clips to the computing device 102 through a digital communication channel such as a USB port, an infrared port, a wireless port, or any other communication medium. In another embodiment, the video source 106 is a storage device such as an optical storage device, compact discs, digital video discs, etc. In another example, the storage device can be a magnetic storage device such as a magnetic tape or a hard drive. In another embodiment, the storage device can be a solid-state memory device. Video source 106 can be any source or repository from which a video signal corresponding to moving images, in any form or format now known or to become known may be obtained for rendering into a visible perceptible form by a computer device.

For example, the video signal can correspond to a video clip. The video clip can be a prerecorded digital video file that is downloaded to the computing device 102. Playback controls such as rewind, pause, fast forward, etc. can be available for the video clip.

Furthermore, the computing device 102 can be a laptop computer, a personal desktop computer, a game console, a set-top box, a personal digital assistant, a smart phone, a portable device, or any other computing device that can be configured to receive video from a source for rendering into perceptible form on a display 104.

Likewise, the display 104 can be coupled to the computing device 102 in order to receive video signals and audio signals for presentation of a video. Examples of a display 104 can include a computer display, a flat panel display, a liquid crystal display, a plasma display, a video projector and screen, a CRT display or any other visual display that can be configured to play the video received from the computing device 102.

Figure 1B:
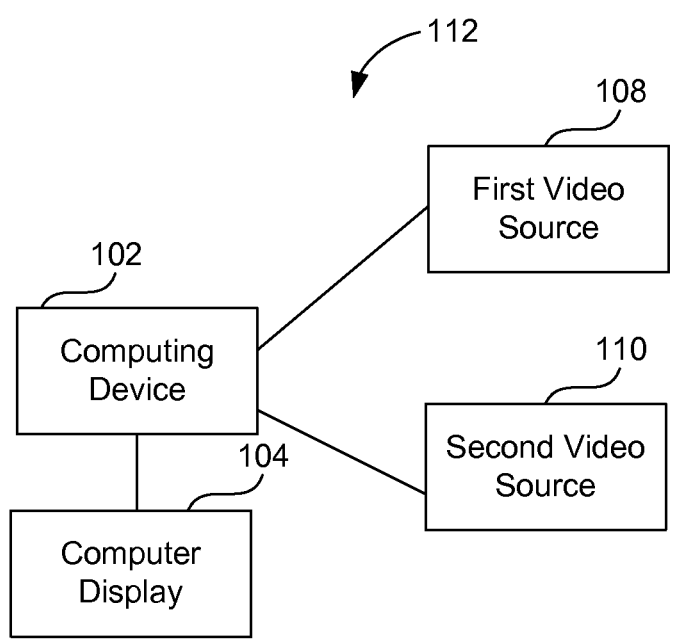

FIG. 1B depicts a system 112 for presenting video. In one embodiment, the computing device 102 can receive video clips from a plurality of video sources. For example, the computing device 102 can receive video signals from a first video source 108 and from a second video source 110. The video signals received from the first video source 108 and from the second video source 110 can then be communicated for visible display on the display 104. The first video source 108 and the second video source 110 can be any one of the video sources exemplified above in connection with video source 106. For example, the first video source 108 and the second video source 110 can be one or more video servers that stream video to the computing device 102.

In addition, the first video source 108 and the second video source 110 can be independent channels of communication that submit and transmit independent video signals to the computing device 102. In one example, the first video source 108 can be a video streaming server that transmits a video clip signal to the computing device 102, while the second video source 110 can be a source of pre-recorded video, such as a tape or a DVD disc, a mass storage device that stores pre-recorded video, etc.

Figure 2:
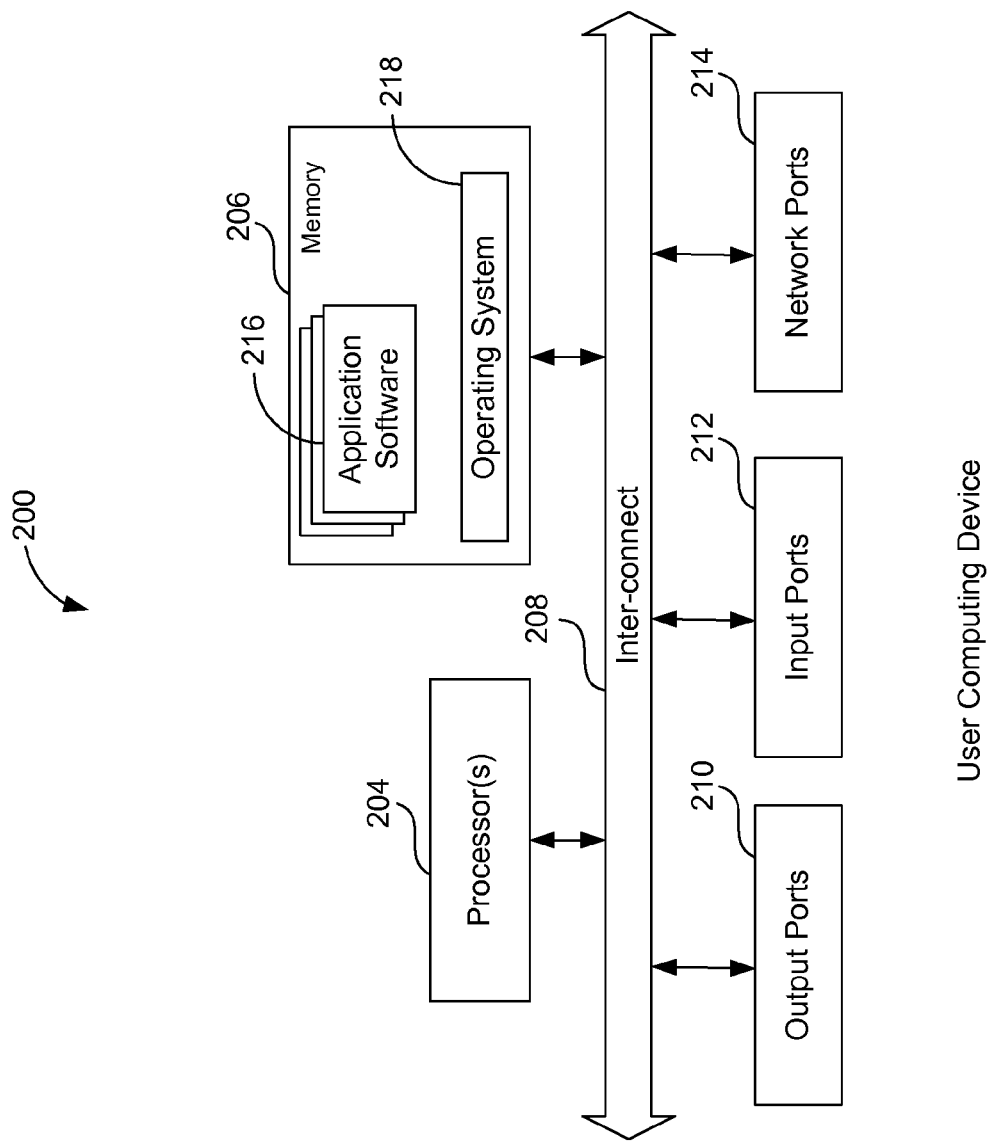
FIG. 2 depicts a component diagram of a user computing device according to one embodiment.

FIG. 2 depicts a component diagram of one example of a computing device 200. The computing device 200 can be utilized to implement one or more computing devices, computer processes, or software modules described herein. In one example, the computing device 200 can be utilized to process calculations, execute instructions or receive and transmit digital signals, as required by the computing device 200. In one example, the computing device 200 can be utilized to process calculations, execute instructions or receive and transmit digital signals, as required by user interface logic, video rendering logic, decoding logic, or search engines, as discussed below.

Computing device 200 can be any general or special purpose computer now known or to become known capable of performing the steps and/or performing the functions described herein, either in software, hardware, firmware, or a combination thereof.

The computing device 200 includes an interconnect 208 (e.g., bus and system core logic), which interconnects a microprocessor(s) 204 and memory 206. The interconnect 208 interconnects the microprocessor(s) 204 and the memory 206 together. Furthermore, the interconnect 208 interconnects the microprocessor 204 and the memory 206 to peripheral devices such as input ports 212 and output ports 210. Input ports 212 and output ports 210 can communicate with I/O devices such as mice, keyboards, modems, network interfaces, printers, scanners, video cameras and other devices. In addition, the output ports 210 can further communicate with the display 104.

Furthermore, the interconnect 208 may include one or more buses connected to one another through various bridges, controllers and/or adapters. In one embodiment, input ports 212 and output ports 210 can include a USB (Universal Serial Bus) adapter for controlling USB peripherals, and/or an IEEE-1394 bus adapter for controlling IEEE-1394 peripherals. The interconnect 208 can also include a network connection 214.

The memory 206 may include ROM (Read Only Memory), volatile RAM (Random Access Memory) and non-volatile memory, such as hard drive, flash memory, etc. Volatile RAM is typically implemented as dynamic RAM (DRAM), which requires continuous power in order to refresh or maintain the data in the memory. Non-volatile memory is typically a magnetic hard drive, flash memory, a magnetic optical drive, or an optical drive (e.g., a DVD RAM), or other type of memory system which maintains data even after power is removed from the system. The non-volatile memory may also be a random access memory.

The memory 206 can be a local device coupled directly to the rest of the components in the data processing system. A non-volatile memory that is remote from the system, such as a network storage device coupled to the data processing system through a network interface such as a modem or Ethernet interface, can also be used. The instructions to control the arrangement of a file structure may be stored in memory 206 or obtained through input ports 212 and output ports 210.

In general, routines executed to implement one or more embodiments may be implemented as part of an operating system 218 or a specific application, component, program, object, module or sequence of instructions referred to as application software 216. The application software 216 typically can comprise one or more instruction sets that can be executed by the microprocessor 204 to perform operations necessary to execute elements involving the various aspects of the methods and systems as described herein. For example, the application software 216 can include video decoding, rendering and manipulation logic.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media and optical storage media (e.g., Compact Disk Read-Only Memory (CD ROMS), Digital Versatile Disks, (DVDs), etc.), among others. The instructions may be embodied in digital and analog communication links for electrical, optical, acoustical or other forms of propagated signals, such as carrier waves, infrared signals, digital signals, etc.

Figure 3:
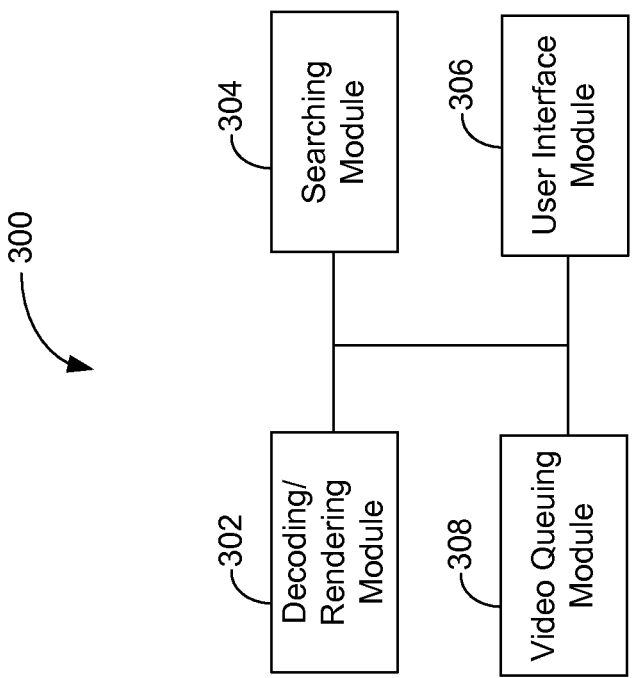
FIG. 3 depicts exemplary software component modules for providing video according to one embodiment.

FIG. 3 depicts exemplary software component modules 300 for playing video. The exemplary software component modules can include a decoding/rendering module 302, a searching module 304, a user interface module 306, and a video queuing module 308. In one embodiment, the decoding/rendering module 302, the search module 304, the user interface module 306, and the video queuing module 308 can be separate components that reside in the user computing device 102 and permit display of video according to the methods and processes described herein. In another embodiment, the decoding/rendering module 302, the search module 304, the user interface module 306, and the video queuing module 308 can be combined into a single component and can be hardware, software, firmware or a combination thereof.

In one embodiment, the decoding/rendering module 302 can be configured with logic to receive video signals and transcode the video signals into a format compatible with the display 104 for visual rendering.

In a further embodiment, the decoding/rendering module 302 can also be configured to receive multiple video signals from multiple video sources and multitask in order to simultaneously transmit the video signals of one or more video sources to the display 104. In addition, the decoding/rendering module 302 can also be configured with logic to operate video playback. For example, the decoding/rendering module 302 can be configured with a play operation, a stop operation, a fast forward operation, a pause operation and/or a rewind operation. Based on user input or another module's input, the decoding/rendering module 302 can execute any one of these operations when playing video. In addition, the decoding/rendering module 302 can also be configured with logic to display data associated with the video clip, for example, the title of the video clip.

Furthermore, the decoding/rendering module 302 can also be configured to playback video content while the user interacts with the user interface and/or the queuing module 308.

In addition, the decoding/rendering module 302 can be configured to buffer video input received from one or more video sources. The buffered video can correspond to live streams, or any other type of video that is streamed to the computing device 102. As part of the buffering operation, the video can be stored in a hard drive, cache, random access memory, or any other memory module coupled with the computing device 102.

In yet another embodiment, the decoding/rendering module 302 can be configured with logic to display the played video as a full screen display or as any other size required by a user. Furthermore, the decoding/rendering module 302 can also include audio control commands and operations that a user can utilize to control both the visual display and the accompanying audio portion, if any.

The user interface module 306 can be configured with graphical user interface items that are displayed at the display 104 in order to provide the user with tools for interacting with the display, rendering, searching, and/or manipulating of one or more video images being displayed at the display 104. As such, the user interface module 306 can include user input mechanisms to select the playing, stopping, rewinding, pausing or fast forwarding of video. In addition, the user interface module 306 can also include commands for maximizing the display of the playing video, minimizing the display of the playing video, dragging and dropping one or more video thumbnails to manipulate the location of video thumbnails on a screen location within display 104, etc.

The user interface module 306 can further include logic to interpret cursor control or user input commands from a user (for example via a mouse or other pointing device) such as selecting or clicking on a video thumbnail, double-clicking on a video thumbnail, permitting a user to hover over or roll-over a video thumbnail, etc. User input mechanisms provided by the user input interface module 306 can include tool tips, drop down menus, pop up menus, radio buttons, hyperlinked items, etc.

The user interface module 306 can be further configured with logic to operate video playback and display. In yet another example, a user can utilize a mouse pointer to double click on a video display region in order to change the size of the video display region. Furthermore, the user interface module 306 can also permit a user to rewind and view a portion of the video. The video can be buffered and saved in a memory module in order to permit later viewing of the video, pausing and resuming the viewing of the video, etc.

The user interface module 306 can also be configured with logic to permit a user to select the video source or video sources from which to receive video signals for display. In addition, the user interface module 306 can also be configured to provide user interface menus for setting display and audio preferences, etc.

The user interface module 306 can be configured to permit a user to select the position of the thumbnails in the display area. In one example, the user interface module 306 can include logic to allow a user to drag video thumbnails to any position on the screen as selected by the user. In another example, the user interface module 306 can include logic to allow a user to set the layout, placement and number of video thumbnails positioned on the display 104. In another example, a user can utilize a mouse pointer to manipulate the location of video thumbnails in relation to one another, and within display panes, or other display regions.

The searching module 304 can also be included as a separate component of the computing device 102 in order to permit a user to enter queries and search for videos that the user may be interested in. For example, if the video source 106 is a database or a computer server that accesses such database, the searching module 304 can be configured to receive user queries and retrieve videos from the database or request a server to retrieve videos from a database or other sources. In one embodiment, the searching module 304 may contain logic or intelligence whereby multiple video sources accessible over a network, for example, the Internet, can be searched for videos matching user search criteria. In another embodiment, videos can be streamed automatically to the computing device 102 according to predefined keywords, or video requests provided by the user.

In one embodiment, the decoding/rendering module 302 resides as a separate application from the searching module 304 and the user interface module 306. Likewise, the user interface module 306 can reside as a separate application. In addition, the searching module 304 can also reside as a separate application. In yet another embodiment, the decoding/ rendering module 302, the searching module 304 and the user interface module 306 can interact together as computer processes as a single application residing at the computing device and being executed on the processor 204 of the computing device. Additionally, the searching module 304 may reside in whole or in part on a server operated by a service provider.

In yet another embodiment, the video queuing module 308 can be configured with logic to assemble video playlists, store the order of play of video playlists, etc. Thus, for example, the video queuing module 308 can be equipped with an append operation that permits the addition of a video clip at the end of a video queue corresponding to a video playlist. In another example the queuing module 308 can further be equipped with a delete operation to remove a clip from the video playlist. In yet another example the queuing module 308 can include an insert operation.

In another embodiment, once a user adds a video thumbnail to a playlist pane, the content of the video corresponding to the video thumbnail can be downloaded to the computing device. For example, the content can be requested from the server, or copied from a storage device. The downloading or copying of the content can occur even if the video content is not being displayed.

In another embodiment, the video queuing module 308 can be configured to permit a user to remove a video thumbnail from the playlist pane. Thus, any video content that has been downloaded to the computing device can be removed or deleted. In one example, the user can delete by dragging and dropping outside the pane, dragging and dropping to a trash icon, selecting (via click or double click) and pressing the delete key, etc.

In another embodiment, the video queuing module 308 can be configured to permit a user to reorder video thumbnails in the playlist pane. Thus, the user can use a drag and drop command to reorder the video thumbnails, and therefore rearrange the playing order of the corresponding video clips.

In addition, the queuing module 308 can be configured to allow the assembling of the video playlist in real-time while a video clip in the video playlist is being accessed or played. Thus, for example, the queue module 308 can permit a user to drag and drop a video thumbnail or interact with video thumbnails of the playlist without interruption of the ongoing video playback.

Figure 4:
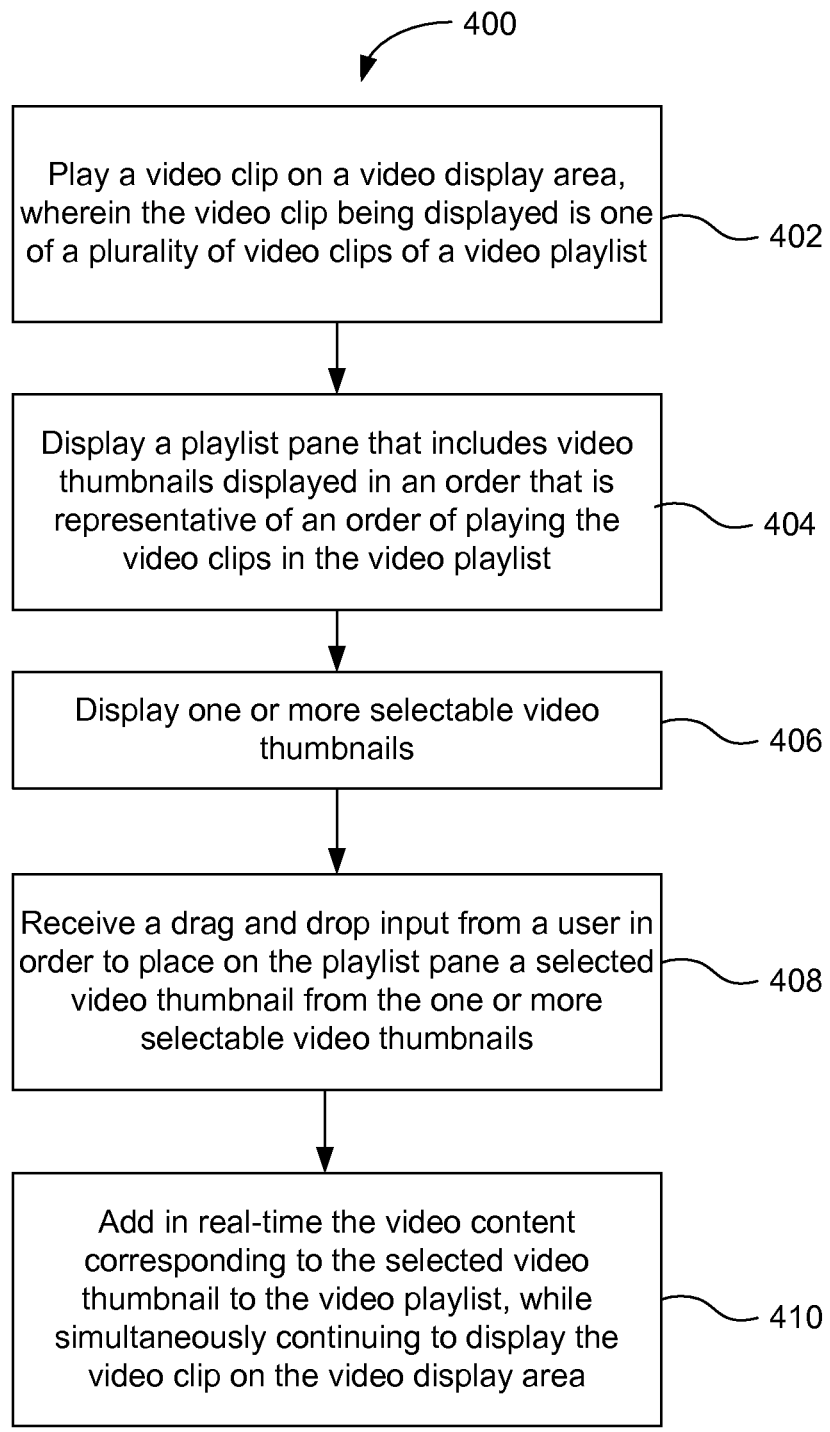
FIG. 4 depicts a flow diagram of a process for playing a video according to one embodiment.

FIG. 4 depicts a flow diagram of a process 400 for presenting video on a display according to one embodiment. At process block 402, a video clip is displayed on a video display area. The video clip can be one of a plurality of video clips of a video playlist. The process 400 continues at process block 404.

At process block 404, a playlist pane can be displayed that includes video thumbnails displayed in an order that is representative of an order of play of the video playlist. The process 400 continues at process block 406. At process block 406, one or more selectable video thumbnails can also be displayed. The process 400 continues at process block 408.

At process block 408, a drag and drop input is received from a user in order to place on the playlist pane a selected video thumbnail from one or more selectable video thumbnails. The process 400 continues at process block 410.

At process block 410, the video content corresponding to the selected video thumbnail is added in real-time to the video playlist while simultaneously continuing to play the video clip on the video display area. In other words, the selected video thumbnail can be inserted in the video playlist while the current video clip is playing.

Figure 5:
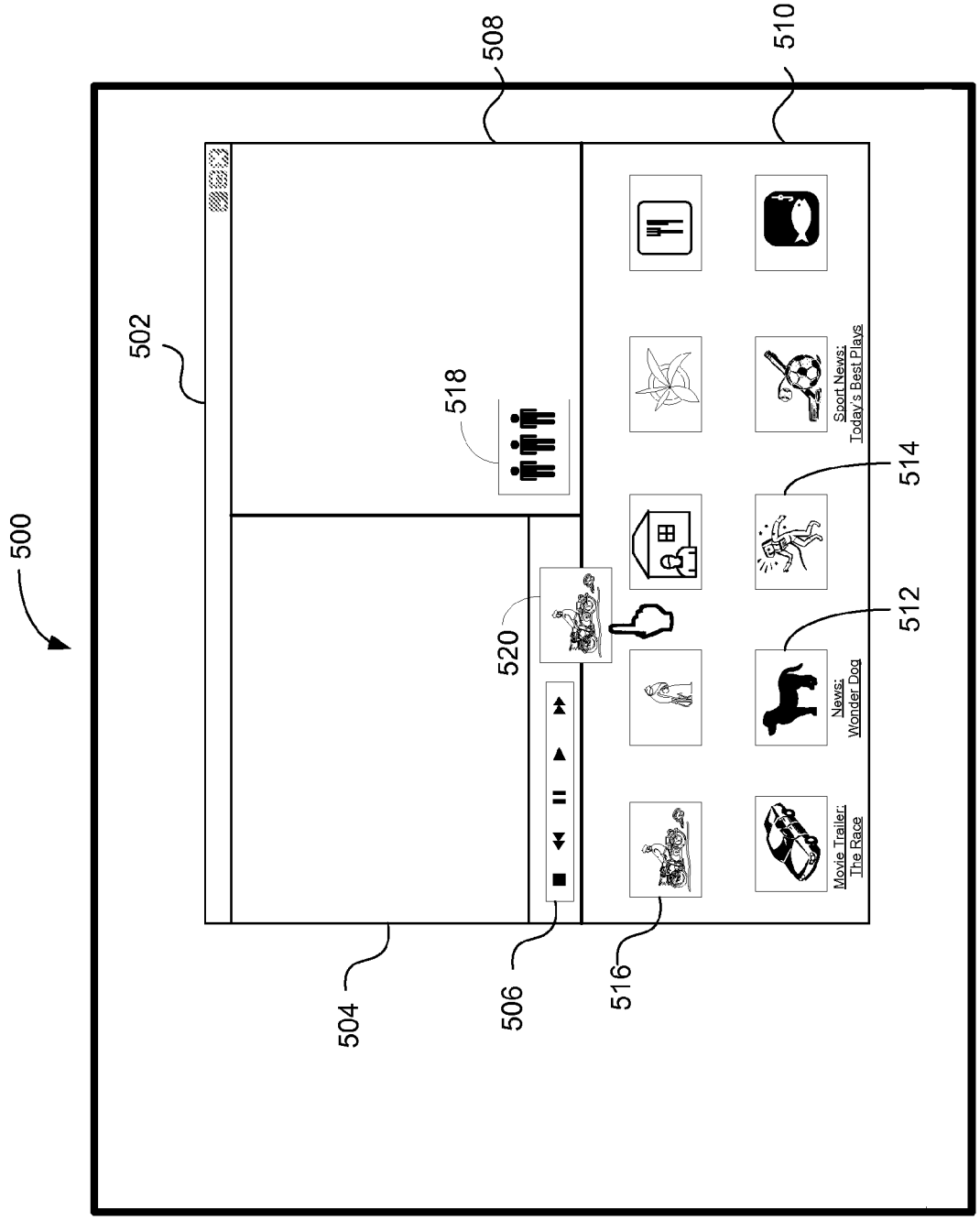
FIG. 5 depicts an exemplary user interface for selecting a video clip according to one embodiment.

FIG. 5 depicts an exemplary user interface for selecting a video clip according to one embodiment. The user interface 502 can be displayed on a screen 500. The user interface 502 can correspond to a computer application such as a web browser or any other stand-alone computer application. In one embodiment, the computer application can for example include the video decoding/rendering module 302, the searching module 304, the user interface module 306, the video queuing module 308, or a combination thereof. In addition, the computer application can transmit and receive data over the Internet or any other computer network.

The user interface 502 can include a video display area 504 and a control bar 506 that can be utilized by a user to manipulate playback of a video item such as a video file. The video display area 504 can be a screen area where video rendered by the computer application associated with user interface 502 can be displayed and viewed by a user. In addition, user interface 502 can also include a playlist pane 508. A playlist pane 508 can include one or more video thumbnails corresponding to video items that are to be played sequentially on the video display area 504. As such, the computer application associated with user interface 502 can include a media player application that permits the user to sequentially view one or more video thumbnails of playlist pane 508. As discussed previously, such logic can be, for example, implemented as the decoding/rendering module 302.

User interface 502 can further include a selectable thumbnails pane 510. The selectable thumbnails pane 510 can include, for example, video thumbnails 512, 514 and 516. Video thumbnails 512, 514 and 516 are examples of video thumbnails that can be displayed on the selectable thumbnails pane 510 for selection by a user. Selection by a user can comprise double clicking with a mouse pointer, clicking with a mouse pointer, keyboard input, or any other user interface action.

In one embodiment, a user can select one or more selectable thumbnails from selectable thumbnails pane 510. The user can then drag the selected thumbnail to the playlist pane 508 in order to build a playlist of video items. The user can be provided with the ability to select and drag a video thumbnail anywhere in the sequence of video thumbnails displayed in playlist pane 508. For example, a user can select video thumbnail 516 and drag the video thumbnail 516 to the video playlist pane 508.

As the user selects and drags the selected video thumbnail, the video thumbnail can be shown or displayed as the video thumbnail is being moved. As depicted by video thumbnail 520, the user can drag the moving video thumbnail 520 to the playlist 508. The video thumbnail 520 can be inserted before the video thumbnail 518 or after the video thumbnail 518. As such, the user can select the order of the playlist and rearrange as desired such that video is played in the sequential order desired by the user.

In addition, the video clips available for selection can comprise video from different sources that the user would like to view as a playlist. For example, a user may want to select a news video clip relating sports, and furthermore, select a movie trailer. Each of these video clips can be downloaded, or streamed from two different sources (e.g., a news website, and a film's website). The different sources from which the user can choose can be accessible through a data network, such as the Internet.

In a further embodiment, the user can double-click, or otherwise provide a selecting input for playing a video thumbnail displayed in playlist pane 508. As such, the video clip playing in video display area 504 can stop playing, and the video clip corresponding to the selected video thumbnail start playing in the video display area 504. In one example, the playing order of the playlist corresponding to the playlist pane 508 can continue to play the next video clip after the selected video clip. Thus, a user can skip ahead in the playlist shown in the playlist pane 508.

As previously discussed, all video thumbnail manipulation commands, such as inserting, appending, deleting and reordering can be executed by the user without interruption to the playing of the video in display 504.

Figure 6:
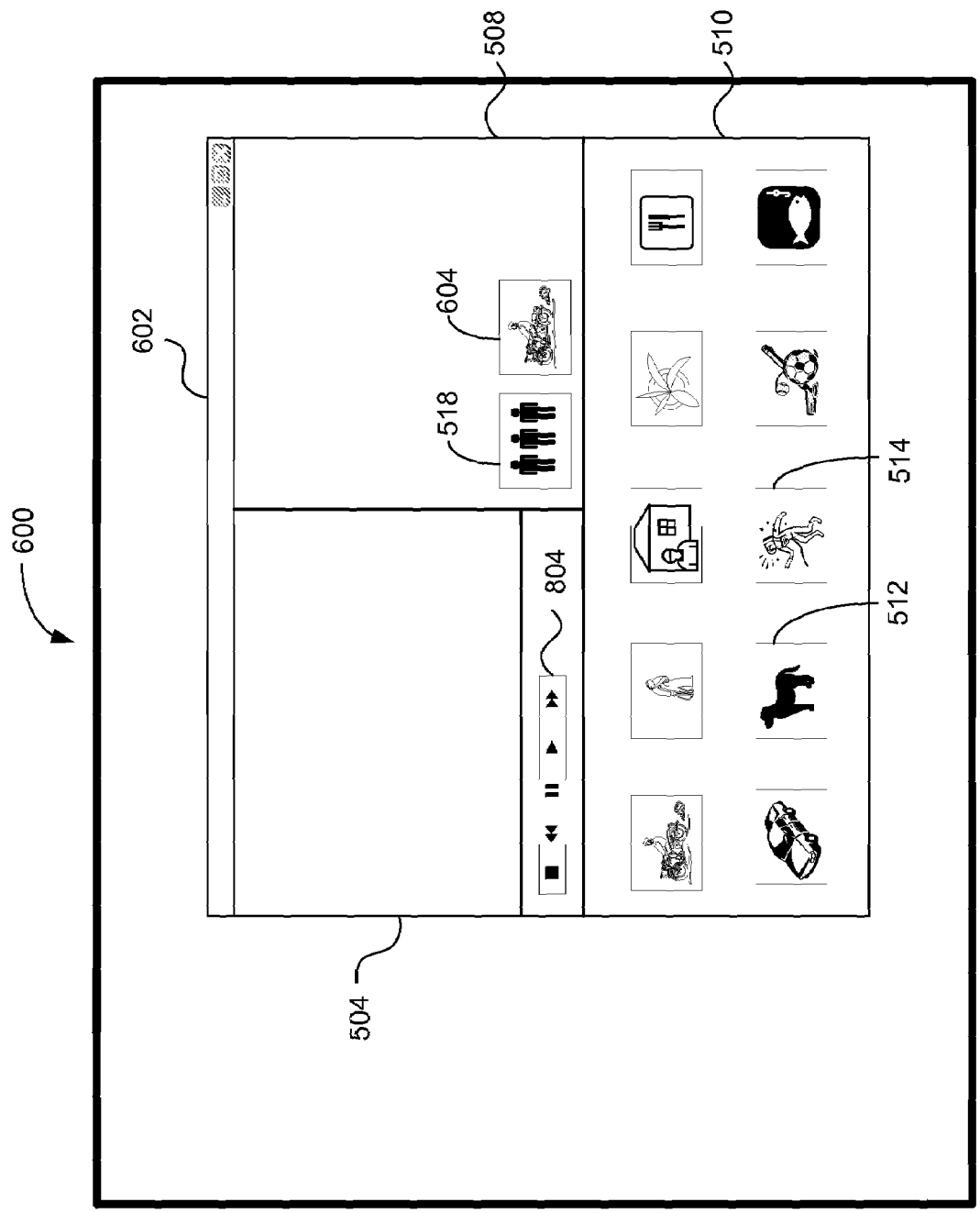
FIG. 6 depicts an exemplary user interface for viewing a video playlist according to one embodiment.

FIG. 6 depicts an exemplary user interface for viewing a video playlist according to one embodiment. User interface 602 further illustrates the video thumbnail 604 that has been dragged and dropped onto playlist pane 508. As such, the video playlist associated with playlist pane 508 can include the video clip corresponding to video thumbnail 518 and the video clip corresponding to video thumbnail 604. Therefore, the video playlist would play, in order, the video thumbnail 518 and the video thumbnail 604. A user can therefore select to play video thumbnail 518. Once the video clip associated with video thumbnail 518 is completely finished, the video clip associated with video thumbnail 604 can automatically start playing. Therefore, a user does not have to select a play button or function for each video clip that the user wants to view. Rather, the user can simply select all of the video clips that the user would like to view and associate such video clips with a video playlist which then automatically plays the video clips on the playlist in the order indicated by the user.

Figure 7:
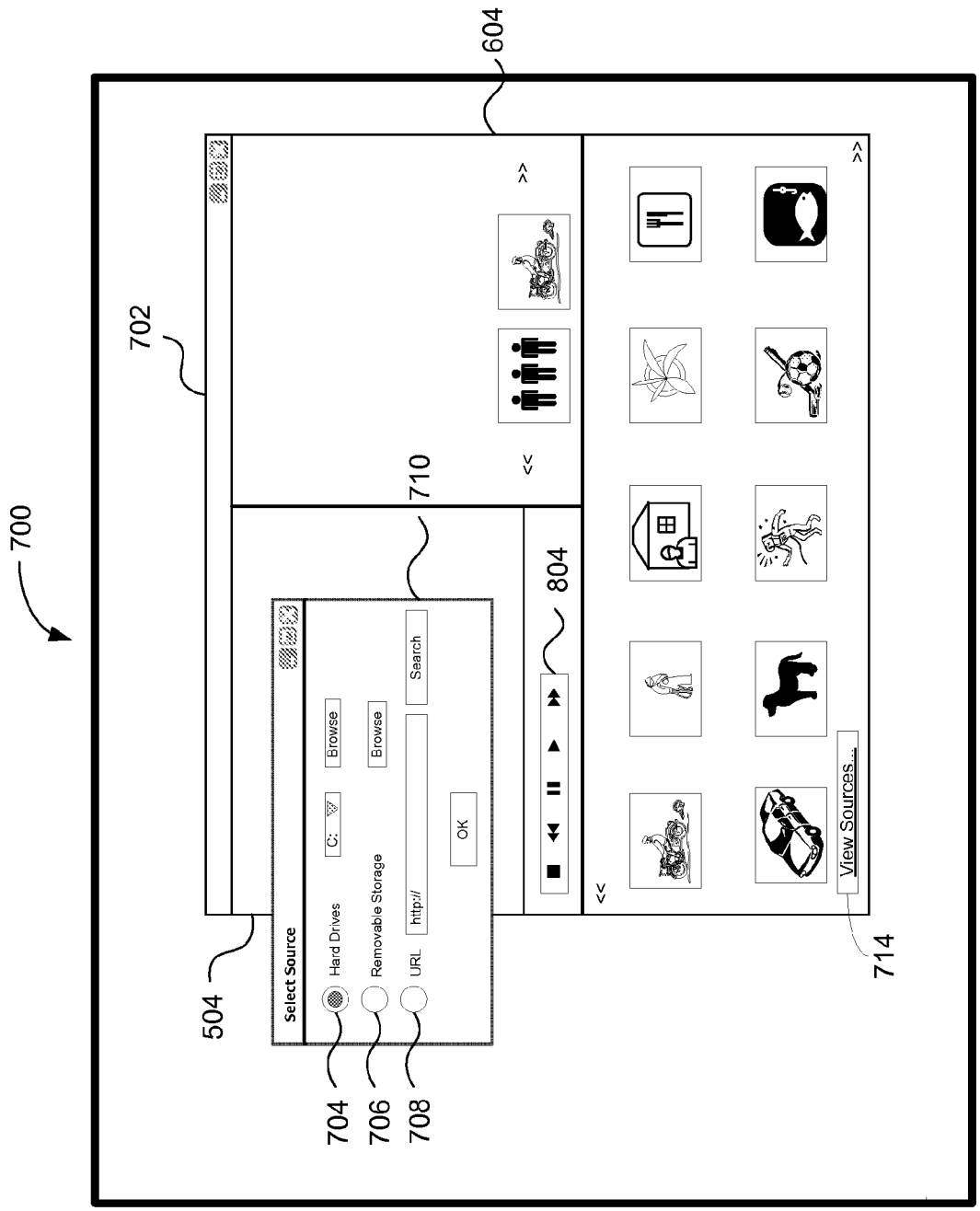
FIG. 7 depicts an exemplary user interface for selecting a video source according to one embodiment.

FIG. 7 depicts an exemplary user interface for selecting a video source according to one embodiment. The user interface 702 can further be provided with a view sources button 714. The view sources button 714 allows the user to select one or more video sources, causing the associated video thumbnail to be added to the video thumbnails in the selectable thumbnail pane 510. As such, a user that selects the view sources button 714 can be provided with a dialog box 710 which includes one or more options for selecting a video source. For example, a hard drive option 704 permits the user to select a specific drive that is either local or on a network. The hard drive can store video clips to be downloaded or streamed onto the video player at the computing device 102. In another example, a removable storage option 706 permits a user to browse and select a specific storage device or removable storage device.

In another embodiment, the playlist pane 508 can provide scrolling buttons, bars, or any other scrolling user interface. Thus, if the playlist pane is resized to a small area display, a user can scroll through the list of video thumbnails displayed in the playlist pane.

As one skilled in the art will understand, other user interface mechanisms can be utilized to provide a list of available video clips. For example, lists, links or other video representation user interfaces can be displayed in a window, pane or other display area to list available video clips. Likewise, the playlist of videos clips can be presented in one or more user interface mechanisms such as lists (e.g., title lists, etc).

Figure 8:
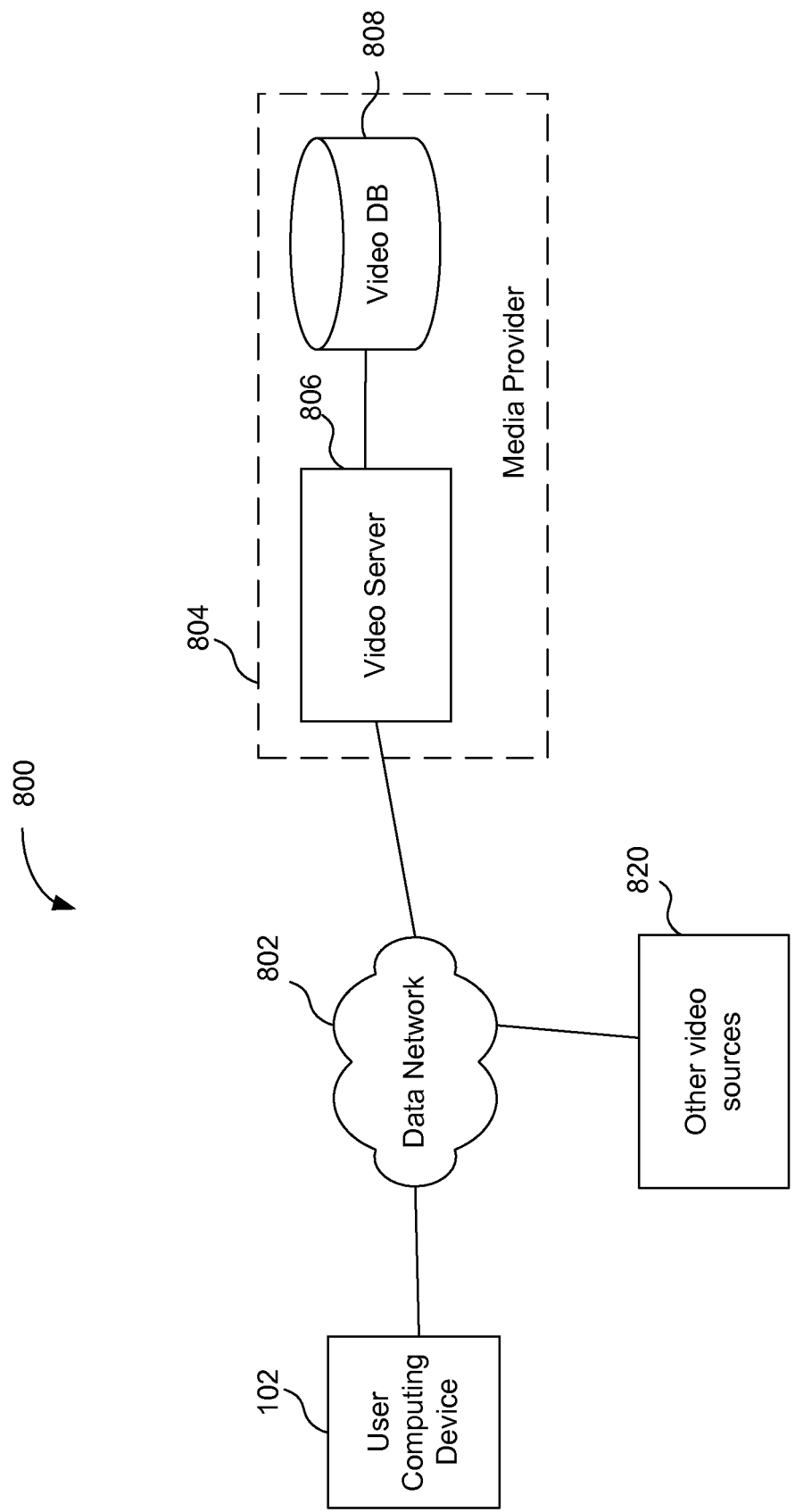
FIG. 8 depicts an embodiment of a networked system for presenting video.

FIG. 8 depicts a networked system for presenting video. A client/server system 800 can be utilized to implement the methods described herein. A user computing device 102 can be utilized to receive a video stream or other format of video that can be communicated over a data network 802 from a media provider 804, or other video sources 820. As previously mentioned, the computing device 102 can receive video signals from one or more video sources. In one embodiment, the video source can be a media provider 804 that streams video signals via a data network 802 to the computing device 102. In another embodiment, the video source can be a media provider 804 that retrieves video signals via the data network 802 and thereafter transmits the video signals (e.g., video clip) to the computing device 102.

In one embodiment, the data network 802 can be the Internet. In another embodiment, the data network can be an intranet. In alternate embodiments, the data network 802 can be a wireless network, a cable network, a satellite network, or any other architecture by which media can be communicated to a user computing device.

The media provider 804 can include a video server 806 and a video database 808. In one embodiment, the video database 808 can be a repository or a mass storage device that stores data or video or any other media that can be retrieved by the video server 806. In another embodiment, the video database 808 can contain pointers indicating where media may be found at other video sources 820.

The video server 806 can be configured to transmit the retrieved video from the video database 808 and submit the retrieved video through the data network 802 to the computing device 102. The video database 808 can include prerecorded video clips that have been stored by the video server 806 upon a storage command from one or more entities. For example, the user can request the storage of a video on the video database 808 by submitting the video to the video server 806 for storage.

In another embodiment, the video database 808 includes prerecorded video that has been produced by the media provider 804 and that can be provided to the user through the computing device 102. In yet another embodiment, the video database 808 can include, by way of non-limiting example, video that has been submitted to the media provider 804 for distribution to users through the Internet. Additionally, the video server 806, or other server or processor, can also be configured to stream or download a video clip to the computing device 102. Furthermore, the video server 806 can be configured to transmit two or more video signals to the computing device 102 simultaneously. For example, the video server 806 can retrieve two video clips from the video database 808 and stream the two video clips through the data network 802 to the computing device 102. As previously discussed, the computing device 102 can be configured to display two or more video clips simultaneously.

Figure 9:
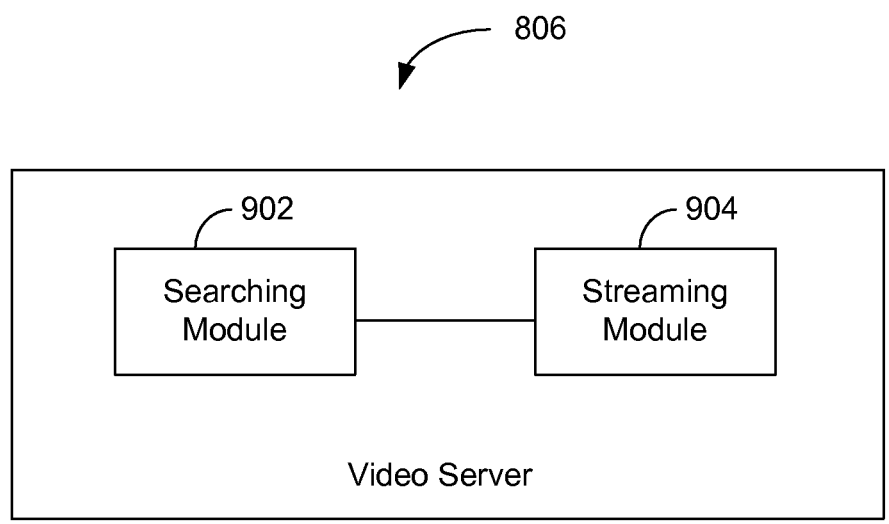
FIG. 9 depicts a component diagram of a media server according to one embodiment.

FIG. 9 depicts a component diagram of a video server 806. In one embodiment, the video server 806 can include a searching module 902 and a streaming module 904. The searching module 902 can be configured with logic to receive query instructions from a user through a data network 802 and retrieve relevant video clips or files from the video database 808. For example, a user that is searching for a video that is relevant to a sporting event can enter a query at the computing device 102. The query can then be received at the video server 806 and processed at the searching module 902. Using known techniques and algorithms for searching, the searching module 902 can search in the video database 808 to retrieve video clips relevant to a user's search. Furthermore, the searching module 902 can also be configured with logic to search in other video sources 820 through the data network 802.

In addition, the video server 806 can also include a streaming module 904 that can be configured with logic to receive the retrieved video clips from a searching module 902 and send data packages over the data network 802 to the computing device 102. In addition, the streaming module 904 can also be configured to transcode any format of video, including live video, into data packages for transmitting to the computing device 102. In a further embodiment, the video server 806 can be configured with logic to transmit to the computing device 902 video signals received from other video sources 820 through the data network 802. The video server 806 can further include other functionalities such as downloading, transcoding, digital rights management, playlist management, etc.

The played video can be of multiple formats. For example, the played video can be any type of visual media, including photo slideshows, presentation slideshows, flash animations, prerecorded video clips of news, commentary, video and podcasts, still images, etc.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware, software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features, functions and interfaces, and those variations and modifications that may be made to the hardware, software or firmware components described herein would be understood by those skilled in the art now and hereafter.

The invention claimed is:

1. A method comprising:
   playing a video clip, via a computing device, on a video display area, wherein the video clip being displayed is one of a plurality of video clips of a video playlist;
   displaying on a display of the computing device a playlist pane that includes video thumbnails displayed in an order that is representative of an order of playing the video clips in the video playlist;
   displaying on the display of the computing device one or more selectable video thumbnails;
   receiving, via the computing device, a drag and drop input from a user in order to place on the playlist pane a selected video thumbnail from the one or more selectable video thumbnails; and
   adding, via the computing device, video content corresponding to the selected video thumbnail to the video playlist in real-time, said adding comprising inserting the video content corresponding to the selected video thumbnail into the video playlist, said inserting the video content of the selected video thumbnail occurs during simultaneous and continuous playback of the video clip being played on the video display area without interruption of the ongoing video playback of the video clip being played.

2. The method of claim 1, further comprising playing the video clips of the video playlist in the order of play of the associated video playlist upon receiving a user play command.

3. The method of claim 1, further comprising downloading the video content from a video server.

4. The method of claim 1, further comprising downloading the video content from a storage device.

5. The method of claim 1, wherein the drag and drop input includes a command to append the selected video thumbnail at the end of the thumbnail queue.

6. The method of claim 1, wherein the drag and drop input includes a command to insert the selected video thumbnail in between two thumbnails of the thumbnail queue.

7. The method of claim 1, further comprising receiving a user input that includes a command to delete a video thumbnail previously added to the video playlist.

8. A system comprising:
   a plurality of processors;
   a computer display that displays one or more selectable video thumbnails on a display of a computing device;
   a user interface module implemented via one of said plurality of processors configured to receive a drag and drop input form a user in order to place a selected video thumbnail from the one or more selectable video thumbnails on a playlist pane, wherein the playlist pane includes video thumbnails disposed in a thumbnail queue having an order that is representative of the order of playing the video clips in an associated video playlist; and
   a video queue module implemented via one of said plurality of processors configured to add video content corresponding to the selected video thumbnail to the video playlist in real-time without interrupting ongoing video playback of currently rendered video clip, wherein said adding comprises inserting the video content corresponding to the selected video thumbnail into the video playlist, said inserting the video content of the selected video thumbnail occurs during simultaneous and continuous rendering of the currently rendered video clip.

9. The system of claim 8, further comprising a video rendering module configured to play the video clips of the video playlist in the order of play of the associated video playlist upon receiving a user play command.

10. The system of claim 8, further comprising a video server that stores the video content.

11. The system of claim 8, further comprising a storage device that stores the video content.

12. The system of claim 8, wherein the drag and drop input includes a command to place append the selected video thumbnail at the end of the thumbnail queue.

13. The system of claim 8, wherein the drag and drop input includes a command to insert the selected video thumbnail in between two thumbnails of the thumbnail queue.

14. The system of claim 8, wherein the user interface is further configured to receive a command to delete a video thumbnail previously added to the video playlist.

15. A user interface visibly displayed on a display of a computing device, comprising:
   a first display pane visibly displayed on the display of the computing device that displays one or more video thumbnails in a displayed order representing an order of playing the video clips in a video playlist; and
   a second display pane visibly displayed on the display of the computing device that contains selectable video thumbnails, wherein at least one video thumbnail of the selectable video thumbnails can be dragged by a user to the fist display pane to alter the displayed order and the playing order of the video playlist in real time without interrupting a video clip being rendered, wherein said dragging by the user comprises inserting video content corresponding to the at least one video thumbnail into the video playlist, said inserting the video content of the at least one video thumbnail occurs during simultaneous and continuous rendering of the rendered video clip.

16. The user interface of claim 15, further comprising a third display pane configured to display a video clip corresponding to the one or more video thumbnails in the first display pane.

17. The user interface of claim 15, further comprising scrolling mechanisms that allow scrolling through the one or more video thumbnails.

* * * * *